PULSE FORMING CIRCUIT

Filed June 22, 1959

INVENTOR.
PAUL M. CUNNINGHAM
BY Moody and Phillips
ATTORNEYS

United States Patent Office
2,994,823
Patented Aug. 1, 1961

2,994,823

PULSE FORMING CIRCUIT

Paul M. Cunningham, Dallas, Tex., assignor to Collins Radio Company, Cedar Rapids, Iowa, a corporation of Iowa Filed June 22, 1959, Ser. No. 821,822
9 Claims. (Cl. 328—65)

Figure 1:
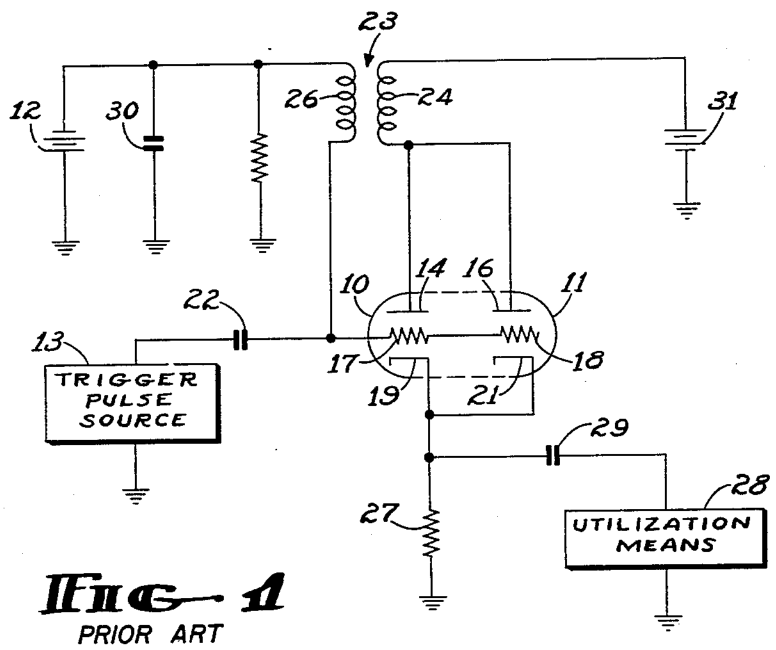
FIG. 1 PRIOR ART

This invention relates generally to blocking oscillator circuits and more particularly to an improved blocking oscillator circuit in which the signal has a faster rise time than has been heretofore obtainable.

In one form of known blocking oscillator circuits, the cathode of the blocking oscillator tube is connected to ground or negative battery through a resistor and the output signal is taken from the cathode. The plate circuit is inductively coupled to the grid circuit to provide the necessary signal regeneration for blocking oscillator operation. In the operation of such a blocking oscillator, it is well known that if a positively poled triggering pulse is supplied to the grid of the blocking oscillator tube, the potential of the plate thereof will change in a negative direction, which change in potential will be inductively coupled back to the grid through the plate circuit (but with a positive polarity), thus increasing the plate current and causing an accumulative effect which will terminate only when the plate current ceases to increase. Such cessation of increase in plate current can occur due to inability of the cathode to produce any additional space discharge current and to the greatly reduced plate to cathode voltage existing at this time. An additional factor is that when the space discharge current emitted by the cathode nears its peak value, it is likely that the potential of the control grid will exceed the potential of the cathode, thus diverting some of the space discharge current from the anode to the control grid and loading the grid circuit to prevent further increase of grid potential.

The effect of the above-mentioned phenomena is not only to decrease the total power which the blocking oscillator can produce, but also to slow down the rise time of the pulse, particularly near the latter stages of the rise time of the pulse.

One expedient employed to overcome this difficulty has been the use of two triodes (or other suitable electron valves) connected in parallel so that similar electrodes are connected together, i.e., so that the anodes are connected directly together, the cathodes are connected directly together, and the control grids are connected directly together in the case of triodes, for example. With the aforementioned arrangement the plate current of both triodes passes through the common cathode resistor. Such an arrangement can be seen to increase by a factor of four, substantially the amount of power which the blocking oscillator can produce. Further, due to the fact that the current through the common cathode resistor is increased substantially, there would be a tendency for the rise time of the output pulse to be improved considerably. However, a difficulty in the above arrangement lies in the fact that the time constant of the plate resistance and the inductance of the transformer varies inversely as the plate resistance. With two tubes arranged in parallel the overall plate resistance is halved and the time constant is doubled. The larger the time constant, the longer will be the rise time of the output pulse.

It is an object of the present invention to provide structure for increasing the rate of rise of the output pulse of a blocking oscillator.

It is a further object of the invention to provide a blocking oscillator having an increased power output.

Another object of the invention is the improvement of blocking oscillators generally.

In accordance with the invention the aforementioned objects are obtained by connecting the plate of a first triode (or other suitable electron valve) of the two triodes (or other suitable electron valves) directly to the plate power supply instead of to the plate of the other of the two triodes, thus forming a cathode follower circuit. As regeneration occurs the plate voltage of the first triode (now being employed as a cathode follower) will then remain at the plate power supply value and will not decrease as will the plate voltage of the triode being employed as the blocking oscillator tube. Thus, during regeneration the current flow through the cathode follower triode will be greater than the current flow through the blocking oscillator tube and the voltage drop across the common cathode resistor will be greater than if the plate of the cathode follower tube were connected directly to the plate of the blocking oscillator tube.

It can be seen that a feature of the invention is that by means of the cathode follower tube the voltage drop across the cathode follower resistor not only will increase faster during regeneration, thus increasing the rate of rise of the output signal, but also will permit the potential of the control grid of the blocking oscillator tube to rise to a higher limiting voltage, thus permitting a higher limiting plate current in the blocking oscillator tube.

Figure 2:
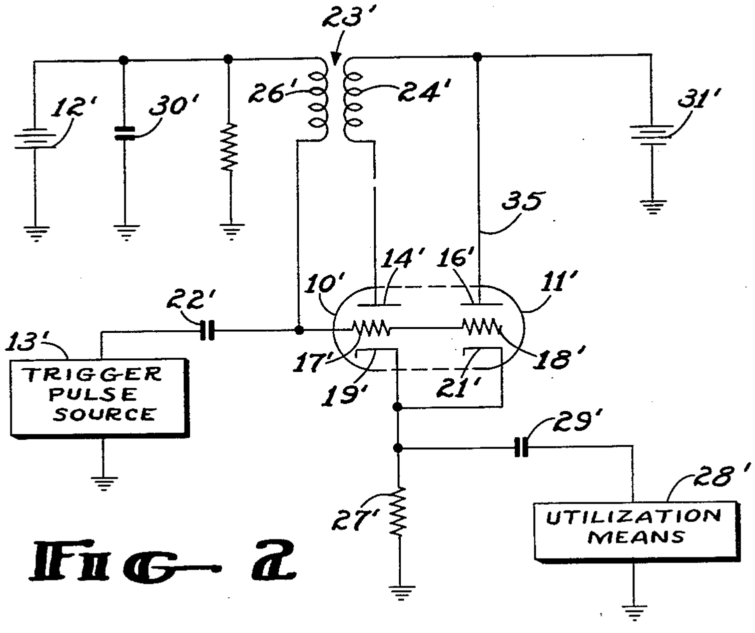

These and other objects and features of the invention will be more fully understood from the following detailed description thereof when read in conjunction with the drawings in which:

FIG. 1 is a schematic sketch of a prior art circuit which is included herein to provide a background for a better understanding of the present invention; and FIG. 2 is a schematic sketch of a preferred embodiment of the invention.

It is to be noted that corresponding elements in different figures herein are identified by similar reference characters, although primed in succeeding figures.

Referring now to FIG. 1 the blocking oscillator comprises a double triode including sections 10 and 11 which are connected in parallel with the plates, grids, and cathodes being connected together respectively. Negative battery source 12 functions to bias the control grids 17 and 18 of tubes 10 and 11 below plate current cut off in the absence of a trigger pulse from source 13, which source is coupled to the control grids 17 and 18 through capacitor 22.

When a pulse is supplied to the control grids 17 and 18 from trigger pulse source 13, regeneration occurs by means of transformer 23 which is comprised of a primary winding 24 in the plate circuit of tubes 10 and 11 and a secondary winding 26 connected to the control grids 17 and 18 of tubes 10 and 11. The output signal is taken from the voltage drop across the common cathode resistor 27 and is supplied to utilization means 28 through coupling capacitor 29. Capacitor 30 is a by-pass capacitor and battery source 31 is the plate voltage supply source for the tubes 10 and 11.

As the blocking oscillator regenerates, its plates 14 and 16 become less positive, its grid potential becomes more positive, and its cathode potential becomes more positive. It can be seen that at the peak of the pulse the plate to cathode voltage becomes quite small for large output signals, which means that tubes 10 and 11 must conduct large currents at considerably reduced driving (plate to cathode) voltage. The peak plate current is determined primarily by tube saturation at the low plate-to-cathode voltage or by transformer saturation. Further, near the peak of the generated pulse the control grids 17 and 18 will draw current to load the grid circuit and regard further any increase in plate current. This grid current is the normal grid current which occurs in blocking oscillator circuits.

Since the output pulse is taken across the cathode resistor 27, it can be seen that the operation of the circuit can be improved by increasing the rate of rise of current flow through the resistor 27 and the maximum current flow obtainable through the resistor 27. As discussed briefly hereinbefore, one method of accomplishing such improved performance is to increase the number of tubes employed in parallel arrangement in the blocking oscillator. In other words, instead of using a single triode or the double triode shown, increased current flow could be obtained by using three or more tubes connected in parallel arrangement. Such an arrangement, however, has a serious defect since the time constant of the total plate resistance and the transformer winding is inversely proportional to said plate resistance. Therefore, the rise time of the pulse would also be inversely proportional to the plate resistance and would increase since the net resultant plate resistance would decrease.

The present invention solves the aforementioned problems by means of the circuit shown in FIG. 2, in which the only change from the circuit of FIG. 1 is that the plate 16' of tube section 11' is connected directly to the positive power supply 31' through lead 35, rather than to the plate 14' of tube section 10'. The tube section 11', in combination with the cathode resistor 27' and the plate supply 31', then becomes a cathode follower circuit. Since the grids 17' and 18' are connected together and the cathodes 19' and 21' are connected together, their respective potentials will rise and fall together. However, since the plate 16' of the tube 11' is connected directly to the power supply 31', its potential will remain at a high level as the output pulse is generated, whereas the potential of the plate 14' of tube section 10' will decrease during the corresponding time interval due to the voltage drop across winding 24'. Because of the high potential maintained on the plate 16' of tube 11' the instantaneous current therethrough at a given point in time (measured from the initiation of a generated pulse) will be greater than in the case of tube 11 of FIG. 1, thus producing a correspondingly increased instantaneous voltage across the cathode resistor 27'. Such increased cathode resistor voltage will enable the potential of the cathode 19' to remain higher than the potential of the grid 17' to a higher limiting value. Thus, the circuit of FIG. 2 functions to provide an increased output pulse with a faster rate of rise than the prior art circuit shown in FIG. 1.

It is to be noted that the specific form of the invention shown herein is but a preferred embodiment of the same and that various changes may be made in circuit arrangement without departing from the spirit or scope of the invention.

I claim:

1. A pulse forming circuit comprising first electron valve means including first electron emitting means, first electron control means, and first electron collecting means, inductive means for regeneratively coupling the signal appearing at said first electron collecting means to said first electron control means, power supply means coupled to said first electron collecting means through said inductive means, load resistor means connected to said first electron emitting means, means for initiating regeneration in said first electron valve means, and second electron valve means comprising second electron emitting means connected to said first electron emitting means, second electron control means connected to said first electron control means and means in parallel with said inductive means for connecting said second electron collecting means to said power supply means.

2. A pulse forming circuit comprising a blocking oscillator, said blocking oscillator comprising a first electron valve having a first electron emitting electrode means, first electron collecting electrode means, and first control electrode means, inductive means for regeneratively coupling the output signal of said electron valve to said control electrode means, power source means connected to said first electron collector electrode means through said inductive means, load impedance means connected to said first electron emitting electrode means, and means for initiating regeneration in said blocking oscillator, and a second electron valve comprising second control electrode means constructed and arranged to be responsive to the potential of said first control electrode to control the current flow thru said second electron valve, second electron emitting electrode means connected to said first electron emitting electrode means, and second electron collecting electrode means connected directly to said power source means.

3. A pulse forming circuit in accordance with claim 2 in which said means for initiating regeneration comprises a trigger pulse generating source and means for coupling the output signal of said trigger pulse generating source to said first control electrode means.

4. A pulse forming circuit comprising a first electron discharge device including first cathode means, first control grid means, and first anode means, inductive means for regeneratively coupling the signal appearing at said first anode means to said first control grid means, power supply means coupled to said first anode means through said inductive means, load resistor means connected to said first cathode means, means for initiating regeneration in said first electron discharge device, and a second electron discharge device comprising second cathode means connected to said first cathode means, second control grid means connected to said first control grid means and second anode means connected directly to said power supply means.

5. A pulse forming circuit in accordance with claim 4 in which said means for initiating regeneration comprises a trigger pulse generating source and means for coupling the output signal of said trigger pulse generating source to said first control grid means.

6. In a blocking oscillator comprising an electron valve means having a first electron emitting electrode means, first electron collecting electrode means, and first control electrode means, inductive means for regeneratively coupling the signal appearing at the said first electron collecting electrode means to said first control electrode means, power supply means connected to said first electron collector electrode means through said inductive means, load impedance means connected to said first electron emitting electrode means, and means for initiating regeneration in said blocking oscillator, second electron valve means comprising second control electrode means constructed and arranged to be responsive to the potential of said first control electrode means to control the current flow thru said second electron valve means, second electron emitting electrode means connected to said first electron emitting electrode means, and second electron collecting electrode means connected directly to said power supply means.

7. A blocking oscillator in accordance with claim 6 in which said means for initiating regeneration comprises a trigger pulse generating source and means for coupling the output signal of said trigger pulse generating source to said first control electrode means.

8. In a pulse forming circuit comprising a first electron discharge device including first cathode means, first control grid means, and first anode means, inductive means for regeneratively coupling the signal appearing at said first anode means to said first control grid means, power supply means coupled to said first anode means through said inductive means, load resistor means connected to said first cathode means, and means for initiating regeneration in said first electron discharge device, a second electron discharge device comprising second cathode means connected to said first cathode means, second control grid means connected to said first control grid means and means in parallel with said inductive means for connecting said second anode means to said power supply means.

9. A pulse forming circuit in accordance with claim 8 in which said means for initiating regeneration comprises a trigger pulse generating source and means for coupling the output signal of said trigger pulse generating source to said first control grid means.

References Cited in the file of this patent

UNITED STATES PATENTS

| | | |
|---|---|---|
| 2,358,544 | Tolson | Sept. 19, 1944 |
| 2,366,307 | Anderson | Jan. 2, 1945 |
| 2,470,698 | Hansell | May 17, 1949 |
| 2,605,423 | Bess | July 29, 1952 |
| 2,696,559 | Mitchell | Dec. 7, 1954 |
| 2,697,166 | MacNichol et al. | Dec. 14, 1954 |